United States Patent [19]

Roerig et al.

[11] Patent Number: 5,127,141
[45] Date of Patent: Jul. 7, 1992

[54] SELF-LOADING CONTROLLED DEFLECTION ROLL

[75] Inventors: Arnold J. Roerig, Beloit, Wis.; Richard R. Hergert, Rockton, Ill.

[73] Assignee: Beloit Corporation, Beloit, Wis.

[21] Appl. No.: 246,941

[22] Filed: Sep. 20, 1988

Related U.S. Application Data

[63] Continuation of Ser. No. 30,805, Mar. 27, 1987, abandoned.

[51] Int. Cl.$^5$ ............................................. B21B 13/02
[52] U.S. Cl. .................................. 29/116.2; 29/113.2; 384/19; 384/256; 384/519
[58] Field of Search ........................... 29/113.2, 116.2; 384/99, 256, 519

[56] References Cited

U.S. PATENT DOCUMENTS

| | | | |
|---|---|---|---|
| 3,885,283 | 5/1975 | Biondetti | 29/116.2 |
| 4,213,232 | 7/1980 | Biondetti et al. | 29/116.2 |
| 4,249,290 | 2/1981 | Lehmann | 129/116.2 |
| 4,291,447 | 9/1981 | Marchioro | 29/116.2 |
| 4,299,162 | 11/1981 | Hartmann | 100/43 |
| 4,319,389 | 3/1982 | Marchioro | 29/116.2 |
| 4,327,468 | 5/1982 | Kusters et al. | 29/116.2 |
| 4,520,723 | 6/1985 | Pav et al. | 100/16.2 B |
| 4,620,348 | 11/1986 | Guttinger | 29/116.2 |
| 4,625,637 | 12/1986 | Pav et al. | 100/47 |

FOREIGN PATENT DOCUMENTS

| | | |
|---|---|---|
| 0205952 | 12/1986 | European Pat. Off. |
| 2236109 | 1/1975 | France |
| 2441087 | 6/1980 | France |
| 1433435 | 4/1976 | United Kingdom |

Primary Examiner—Mark Rosenbaum
Assistant Examiner—Frances Chin
Attorney, Agent, or Firm—Dirk J. Veneman; Raymond W. Campbell; Gerald A. Mathews

[57] ABSTRACT

A self-loading controlled deflection roll has its tubular shell rotatably supported on front and back bearings which, in turn, are mounted on a bearing ring which is outwardly-movable arcuately on a pair of opposed pistons and shoes at either end of the roll. The bearing ring at each end of the roll is pivotally-linked with the roll shaft to prevent skewing movement between their longitudinal axes. The opposed pistons and shoes operating within the bearing rings at the edges of the roll shell position and load the roll into and out of nipping engagement with a mating roll independently of the operation of a separate nip shoe which controls the deflection of the roll. The pistons within the bearing rings can be used to either provide additional nip loading independent of the nip shoe, or provide a counterload in the opposite direction. Both can be used for edge correction.

14 Claims, 2 Drawing Sheets

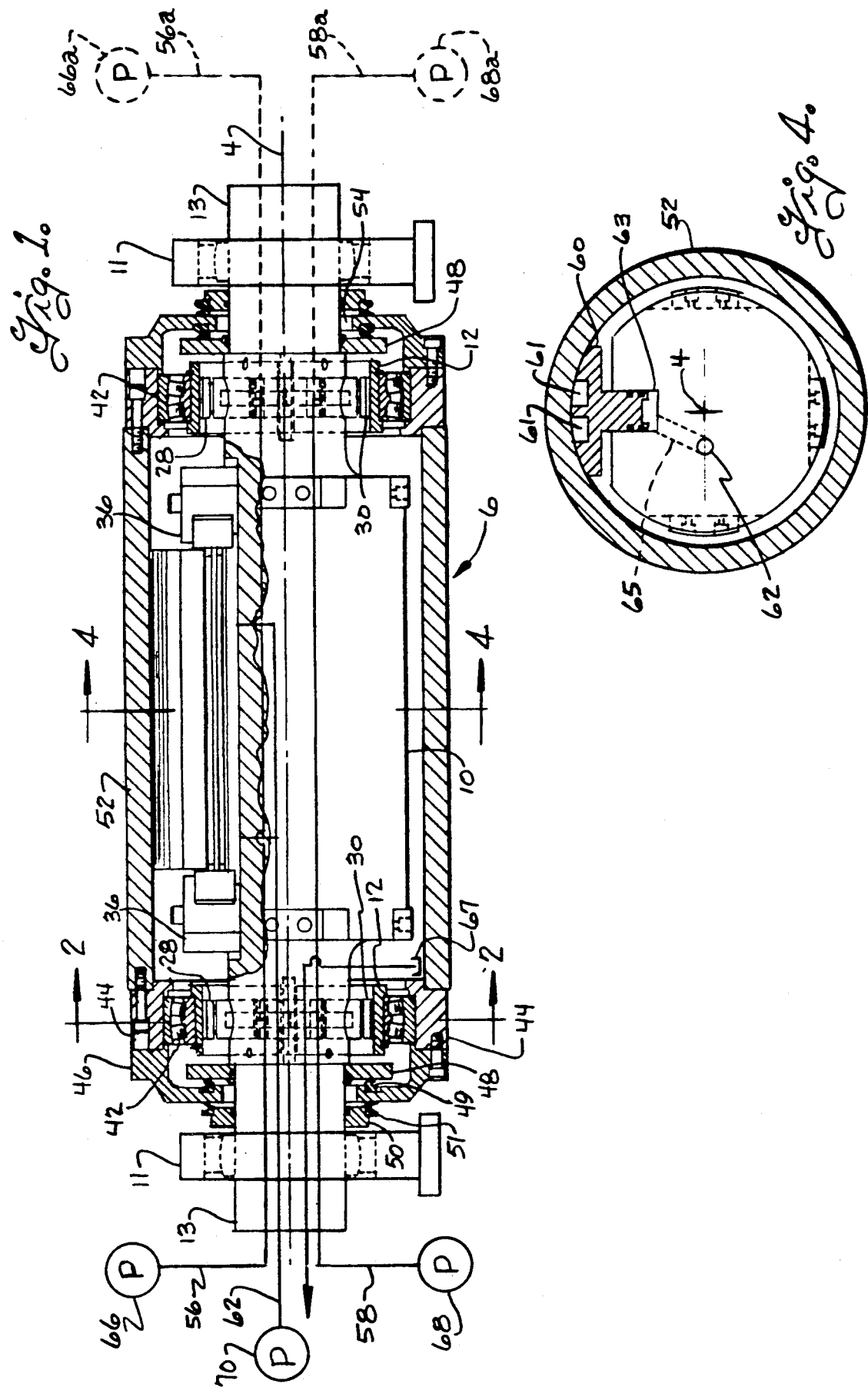

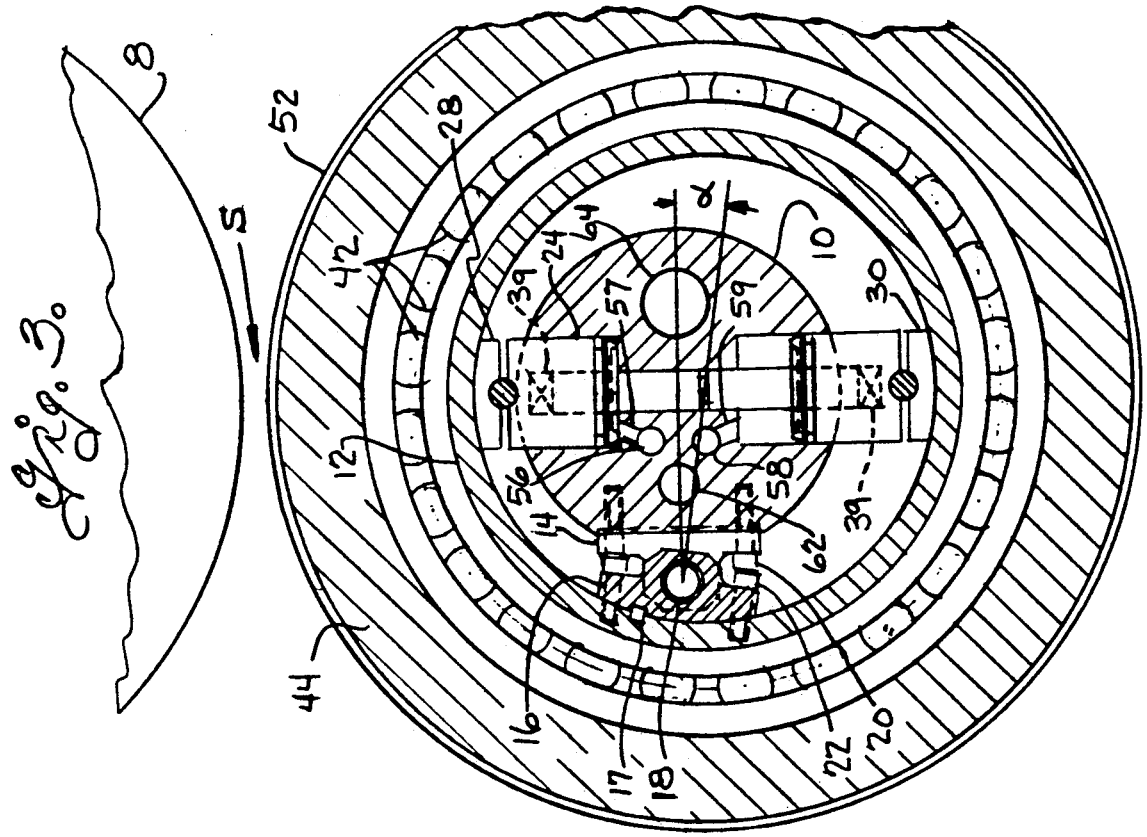
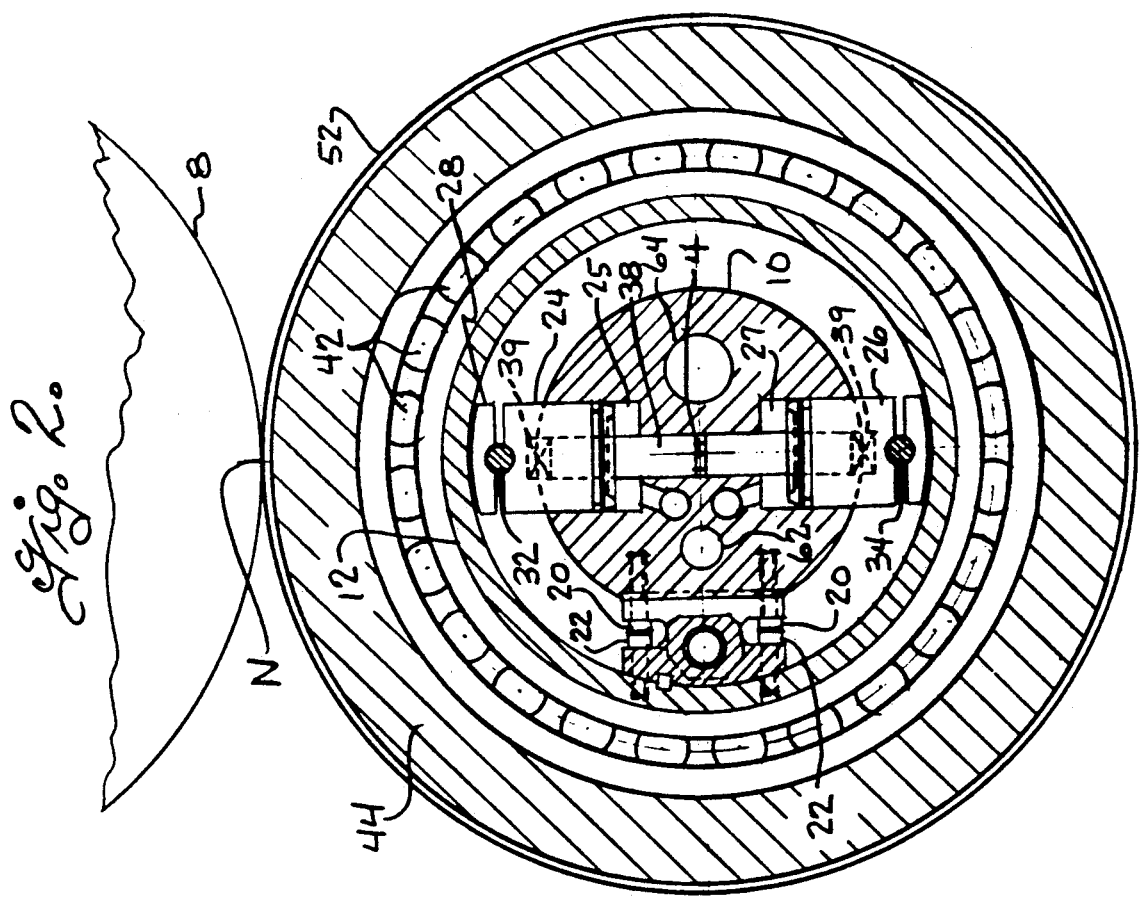

SELF-LOADING CONTROLLED DEFLECTION ROLL

This is a continuation of co-pending application Ser. No. 07/030,805 filed on Mar. 27, 1987.

BACKGROUND OF THE INVENTION

This invention relates to controlled deflection rolls such as used in the papermaking industry. However, controlled deflection rolls can be used in any application wherein the deflection, or crown—as reverse deflection is sometimes called, of the roll face is desired to be controlled with respect to a nip with a mating roll to provide either a straight line of nip contact or a matching contour of the nip line of contact between the rolls.

More particularly, this invention relates to so-called self-loading controlled deflection press rolls. In this type of controlled deflection roll, the roll shell is pivotally-movable, in a translational sense, relative to the supporting fixed roll shaft from an initial position spaced from the mating roll to a second position with the mating roll shells in contact. It accomplishes this without moving its shaft and without external lever arms, hence the term "self-loading".

This self-loading operation is known in the art, such as, for example, in U.S. Pat. Nos. 3,885,283, 4,213,232, 4,249,290 and 4,520,723. However, prior self-loading controlled deflection rolls either utilized a yoke having parallel sliding surfaces operating in conjunction with corresponding surfaces on either end of the roll shaft, or utilized one or more shoes supporting the roll longitudinally along the length of the roll to position the roll shell radially into contact with the mating roll, control the deflection of the roll shell and provide the nipping force, or both. Providing all of these functions by the same shell-supporting pressure shoes causes increased wear on these pressure shoes to the detriment of the roll's operational service time.

In addition, the sliding action of the yoke against the mating surfaces on the roll support shaft requires increased energy to load and unload the roll, especially if the bearings bind. These sliding surfaces also require close tolerances to operate accurately and prevent vibration. Therefore, they are expensive to manufacture. If the tolerances are too loose, the movement of the roll shell, and nipping engagement with another roll, will not be accurate.

SUMMARY OF THE INVENTION

In this invention, the roll shell is rotatably supported at either end of the roll by a bearing which has its inner race mounted on a non-rotating bearing ring. This bearing ring is, in turn, mounted about the longitudinal axis of the fixed roll support shaft and is pivotally-attached to the shaft. This permits the bearing ring at either end of the roll to move in an arc about the pivot which is parallel to, and spaced from, the longitudinal axis of the roll.

A pair of pressurized, opposed pistons are mounted in bores in the roll shaft, extending radially relative to its longitudinal axis at either end of the roll, to bear against the inner periphery of the bearing ring. This permits the pressure-actuated pistons at either end of the roll to pivotally move the bearing ring, and thus the roll shell, relative to the supporting roll shaft. The opposed pistons bearing against the bearing ring and the pivot provide a secure mounting for the shell without having to provide costly tolerances required with a sliding yoke-type arrangement.

Within the roll, between the bearing supports, is one or more shoes for providing pressure against the inner surface of the roll shell to control the deflection, or crown, of the roll shell relative to a plane at the nip line of contact with a mating roll and parallel to the longitudinal axis of the roll. This nip loading shoe arrangement is completely separate from the roll positioning, or roll loading, piston and bearing ring arrangements at either end of the roll and, thus, if desired, is free to operate only to correct the contour of the roll surface regardless of the loading force being applied.

By virtue of the location of the opposed pistons and shoes beneath the bearings at either end of the roll, these loading pistons can also operate to vary deflection or edge corrections on the roll to control web profile.

In addition, by separating the roll positioning and loading pistons and shoes, operating in conjunction with the bearing ring beneath the bearings, from the shoe, or shoes, which bias the roll shell against the roll shaft to control the roll deflection, or crown, different types of shoes can be used for these two functions. Specifically, either hydrodynamic or hydrostatic shoes can be used to control roll deflection while a specialized type of shoe face may be used against the non-rotating bearing ring to optimize the application of force against it from the roll loading shoes. This permits greater flexibility in overall roll design, flexibility and application.

Accordingly, it is an object of this invention to provide a self-loading controlled deflection roll having separate means to load the roll and control its deflection.

Another object of this invention is to provide a controlled deflection roll wherein the roll is loaded by applying force to the bearings, which rotatably support the roll in a pivotally outwardly direction relative to the roll shaft.

A feature of this invention is that the roll loading means and deflection correcting means are independent of one another.

An advantage of this invention is that the shoes actuated by the loading pistons do not act against the rotating roll shell, but bear directly against the non-rotating bearing ring.

These, and other objects, features and advantages of this invention will be readily apparent to those skilled in the art upon reading the description of the preferred embodiment in conjunction with the attached drawings.

IN THE DRAWINGS

FIG. 1 is a side-elevational view of the controlled deflection roll, partially in section, showing both the roll loading arrangement and shell deflection control shoe.

FIG. 2 is an end view along section "2"—"2" of FIG. 1 showing the loading pistons and shoes, and the pivotal connection, between the bearing ring and the roll shaft.

FIG. 3 is the same end view as shown in FIG. 2, but showing the lower loading pistons actuated to open the nip between the mating rolls.

FIG. 4 is an end view, along section "4"-"4", of FIG. 1 and showing the deflection control shoe.

DESCRIPTION OF THE PREFERRED EMBODIMENTS

As shown in FIG. 1, a self-loading controlled deflection roll has a center support shaft 10 with journals 13 extending from either end. These journals are mounted within corresponding supports 11 which locate the roll at its desired position, such as in a press section of a papermaking machine.

This controlled deflection roll, generally designated with the numeral 6, comprises a cylindrical shell 52 having a cylindrical roll collar 44 bolted to its front and back ends. A bearing 42 has its outer race secured in the roll collar 44 at either end of the roll and its inner race secured about a cylindrical bearing ring 12. The bearing ring 12 at each end of the roll is, in turn, supported by a pair of opposed load shoes 28,30 at either end of the roll. As shown in FIGS. 2 and 3, the upper load shoes 28 are, in turn, supported on a first piston 24 by a first pivot rod 32. The corresponding lower load shoes 30 are supported on corresponding lower pistons 26 by second pivot rods 34 at either end of the roll.

Both pairs of pistons 24,26, and their corresponding shoes, extend radially outwardly diametrically from their respective bores (or cavities) 25,27 in support shaft 10 at right angles to the longitudinal axis 4 of the shaft.

To ensure that the shoes 28,30 bear against the inner surface of the bearing ring at all times, even when no hydraulic pressure is in cavities 25,27, a spring 39 is positioned between the inside of each piston 24,26 and the corresponding ends of a piston guide rod 38 which coextends through the roll shaft 10 with each piston 24,26. Thus, springs 39 bias against the upper ends of guide rods 38 to maintain the faces of shoes 28,30 against the inner surface of bearing rings 12.

At the outer ends of roll collars 44, at either end of the roll, is a collar flange 46 which has a center opening 54, preferably circular in shape, of a diameter greater than shaft journals 13 to form a gap between it and the shaft journal 13. On either side of gap 54 is mounted an inner sealing plate 48 and an outer sealing plate 50 which have corresponding inner and outer seals 49,51 to seal the collar flange 46, which rotates with the roll shell, from the stationary journals 13. Both inner and outer sealing plates 48,50 are secured to the stationary journals 13.

Referring to FIGS. 1 and 4, within the stationary shaft 10 is mounted a deflection shoe 60 which is disposed in a longitudinally-extending rectilinear slot 63. At either end of the shoe 60 is an end seal assembly 36 which accommodates flexure of the roll shaft while maintaining fluid sealing engagement with the ends of shoe 60. Hydraulic fluid actuating the shoe 60 is thus sealed at the ends of the shoe even when the shoe is maintained straight while the shaft deflects. This end seal assembly is described and claimed in Justus et al U.S. Pat. No. 3,624,880 which is incorporated herein by reference. This end seal assembly 36 forms no part of the invention per se and will not be described in further detail.

Referring to FIGS. 2 and 3, shaft 10 has a flat side extending at least partially along one side at either end of the roll along the shaft and parallel to its longitudinal axis 4. A pair of pivot supports 14 are bolted to the shaft 10 at either end of the roll inwardly of the bearing ring 12 by socket head cap screws 20. A mating pivot bracket 16 is mounted between the pair of pivot supports 14 at each end of the shaft and mounted to the bearing ring by socket head cap screws 22. To further secure and align the pivot bracket to the bearing ring, a key 17 is also mounted between them.

In operation, the roll is completely at rest, as shown in FIG. 3, with its upper pistons 24 not activated with pressurized hydraulic fluid. However, the springs 39 at either end of piston guide rod 38 maintain the pistons 24,26 and their associated shoes 28,30 biased against the inner annular wall of the bearing ring 12. The upper pistons 24 are bottomed out at the bottom of their bores to maintain the roll shell at a predetermined distance from the shaft 10. For purposes of this discussion, it will be assumed that mating roll 8 is fixedly mounted in the web processing machine. In the non-operating position, such as when changing a felt in a papermaking machine, a space "S" is created between the fixed roll 8 and the controlled deflection roll 6. When it is desired to position the roll 6,8 into loaded, or nipping, engagement, pressurized hydraulic fluid is introduced into conduit 56 by pump 66 and into the bore 25 beneath the upper pistons 14 via risers 57. This pressure forces pistons 24 upwardly in their bores in support shaft 10 and this lifts bearing rings 12 and the bearing 42 mounted on each bearing ring upwardly in an arcuate path about pivot pins 18. The extent of this arcuate path is shown by angle α in FIG. 3. The roll shell 52 is thus raised upwardly and loaded against the face of roll 8 in a nip line of contact. This loaded position is shown in FIG. 2 where the pistons 24,26 are equidistant from the center of the shaft and the arcuate path of travel about pivot pin 18 is tangent to the plane through the nip "N" and roll axis 4.

The upward motion of the bearing ring causes an arcuate movement of collar flange 46 relative to outer seal 51 and inner sealing plate 48 which are fixed relative to the journals 13 of shaft 10. Seals 49,51 prevent hydraulic fluid from escaping the interior of the controlled deflection roll 6 and the gap 54 in the collar flange 46 allows the movement of the roll shell 52 about the roll axis 4. In other words, while the axis of revolution of bearing rings 12 and shell 52 is actually moved arcuately about pivot pins 18, the roll is effectively moved laterally, in a translational sense, along a path approximately in a plane extending between the axes of revolution of the press couple.

To control the deflection of roll 6 against roll 8 along their nip line of contact, pump 70 is actuated to introduce pressurized hydraulic fluid through conduit 62, one or more risers 65 to the cavity channel 63 beneath shoe 60. In this particular embodiment, shoe 60 is a combination piston and shoe. They could be separate pieces. Further, in this embodiment, only one shoe 60 is depicted and it extends for the effective operating length of the roll shell face. It is well known in the industry to use a plurality of separate shoes in the deflection controlling function. These separate shoes may be spaced longitudinally along the length of the roll or be in end-abutting array. In addition, they may be separately hydraulically actuated if desired. These features of the construction of the deflection shoe 60, per se, do not form part of this invention and will not be discussed further.

Within the upper face of shoe 60, which is exposed to the inner surface of roll shell 52, is a plurality of pockets 61 which contain pressurized hydraulic fluid to provide lubricating force against the roll shell to control its deflection relative to the support shaft 10. The shoe, or shoes, 60 can thus be hydraulically-actuated to control the shape, or profile of the nip line of contact between rolls 6,8 independent of the separately actuated hydraulic pistons 24 acting through their shoes 28 on either end of the roll. Naturally, these deflection shoes, or shoe, 60 can also be used to provide additional independent nip loading force, as desired. Expended hydraulic fluid within the roll is withdrawn through outlet conduit 64 via a sump 67.

When it is desired to relieve the nip load between the rolls and open the space "S" between the rolls, such as for repair or replacement of the roll, or replacement of the felt in a papermaking machine, hydraulic pumps 66 and 70 are deactivated and the hydraulic pressure in conduits 56 and 62 are allowed to go to zero (0). If necessary, hydraulic pump 68 can be actuated to introduce pressurized hydraulic fluid through conduit 58 and risers 59 to urge lower pistons 26 and shoes 30 outwardly from shaft 10 to assist in moving the roll shell 52 away from roll 8 and create the space "S".

In the event that the controlled deflection roll 6 is positioned in the web processing apparatus above a mating roll 8, the roll loading procedure, involving pistons 24,26 and their corresponding shoes 28,30, is in the downward position. In other words, the controlled deflection roll is rotated with its deflection shoe 60 directed downwardly. It is positioned and loaded by introducing pressurized hydraulic fluid through conduit 56 into pistons 24 while relief is provided by depressurizing conduit 58 and introducing pressurized hydraulic fluid, if desired, into conduit 62 and actuating shoe 60.

In a variation of the embodiment shown, the load shoes 28,28 and 30,30 at either end of the roll can be independently controlled by pumps 66,68 operating through conduits 56,58 at the front of the roll to control the front load shoes 28,30 and pumps 66a, 68a operating through conduits 56a, 58a, shown in phantom or dashed lines, at the back of the roll. Such independent control of the front and back loading pistons and shoes permits variation in the edge loading of the extreme ends of roll 6 against a mating roll 8. This flexibility is useful in a calender where the control of web caliper is important.

However, this roll provides a new dimension in versatility and flexibility even when corresponding loading pistons 24,26 at either end of the roll are hydraulically-actuated together. For example, in a situation where the roll 6 is positioned beneath the mating roll in a roll couple, and roll 6 is not a driven roll, load pistons 24 at either end of the roll can be actuated to bring the roll shell 52 into nipping engagement with roll 8 since deflection shoe 60 is not needed to move the roll shell into operating position and can remain deactivated. This will allow controlled deflection roll 6 to be brought up to machine speed at which time deflection shoe 60 can be engaged. This permits the use of a hydrodynamic type deflection shoe in a self-loading type of controlled deflection roll. Since a hydrodynamically-operated deflection shoe 60 requires a wedge of oil at the interface of the shoe and inner wall of the roll shell, and since this can only be provided by an oil film traveling with the rotating roll shell to engage the leading edge of the deflection shoe, a hydrodynamically-operated controlled deflection roll could not be used if the deflection shoe itself were the sole means of positioning the roll shell against the mating roll 8. This is due to the fact that the necessary wedge of oil film needed to support the roll shell over the deflection shoe is only created when the roll shell is rotating so, unless the roll shell is rotating before the rolls become nipped together, the contact between the deflection shoe and the inner surface of the roll shell is essentially dry and relative movement between these surfaces at startup would result in excessive wear before the oil film could be created.

When the mating roll 8 is positioned beneath the controlled deflection roll 6, the weight of the controlled deflection roll itself may, in some circumstances, provide sufficient nipping force between the rolls without having to actuate the deflection shoe 60.

In either of these cases, the pistons, 24,26 can be used to provide either additional nipping force or edge load relieving force at the ends of the rolls, depending on whether they are acting in the same, or opposite, direction as the deflection shoe to compliment the operation of the deflection shoe 60 to profile the nip, as desired.

Thus, a self-loading controlled deflection roll has been shown and described which achieves the stated objectives. It is simple in design, but versatile in operation. It can be used above or below the other roll in a roll couple or between two rolls. The nip load, or force, against a mating roll can be provided by the pressure of the loading pistons acting on the bearing ring while the deflection, or crown, profile control can be provided by the deflection shoe. The loading pistons 24,26 and deflection shoe 60 can be operated together to provide the nipping force. Independent edge control at either end of the roll can be provided by controlling the loading pistons independently of the deflection shoe or with separate sources of hydraulic fluid. The movement of the bearing ring is arcuate about the support shaft, but the roll is effectively loaded translationally against another roll. This eliminates the need for external swing arms, air springs and the space they require. Both roll loading and nip deflection control are effected through internal mechanisms. The bearing ring is secured to the roll shaft, but the roll shell can be moved outwardly relative to the longitudinal axis of the roll in a controlled manner.

Naturally, some variations in the structure and operation will be readily apparent to those skilled in the art. It is understood that while the above description pertains to the preferred embodiments, the invention may be otherwise embodied and practiced within the scope of the claims.

What is claimed is:

1. A controlled deflection roll for engaging a mating roll along a nip line of contact therebetween, comprising:
    a stationary roll shaft;
    a roll shell disposed about the roll shaft and defining, with the shaft, a space therebetween;
    a bearing support means provided annularly about the roll shaft, and pivotally attached thereto, for rotatably supporting the roll shell;
    means within the controlled deflection roll between the roll shaft and roll shell for applying deflection-correcting force to the roll shell for positioning the controlled deflection roll and/or adjusting the nip line of contact between the roll shell and mating roll.

2. A controlled deflection press roll for engaging a mating roll along a nip line of contact therebetween, comprising:
    a stationary roll shaft having a longitudinal axis;
    a bearing support means pivotally attached to the shaft;
    a roll shell disposed about the roll shaft and defining, with the shaft, a space therebetween;
    a bearing at either end of the roll shell mounted on the bearing support means, for rotatably supporting the roll shell on the bearing support means;

a deflection shoe means within the roll shell and co-extending with the roll shaft in the space therebetween;

shoe pressure means disposed within the roll shaft for applying deflection-correcting force to the deflection shoe means to position the roll and provide deflection, or crown, correction to the roll shell, or both, as desired;

pressure means, including a pair of opposed shoes engaging the bearing support means at either end of the roll, disposed between the roll shaft and the bearing support means for supporting the bearing support means and forcefully moving it and the roll shell pivotally outwardly in either direction relative to the longitudinal axis of the roll, as desired.

3. A controlled deflection roll as set forth in claim 2, further including:

a first source of fluid pressure operatively connected with the pressure means between the roll shaft and the bearing support means;

a second source of fluid pressure operatively connected with the show pressure means between the roll shaft and the deflection shoe means.

4. A controlled deflection roll as set forth in claim 3, wherein:

the first and second sources of fluid pressure are independent of each other.

5. A controlled deflection roll as set forth in claim 2, wherein:

the pressure means comprises separately controlled means at either end of the roll to provide equal or different supporting and loading forces at either end of the roll, as desired.

6. A controlled deflection roll as set forth in claim 5, wherein:

the pressure means comprise separate sources of controlled fluid pressure.

7. A controlled deflection roll as set forth in claim 2, further comprising:

a first source of fluid pressure operatively connected to corresponding ones of the pair of opposed piston means at either end of the roll shaft;

a second source of fluid pressure operatively connected to the other set of corresponding ones of the opposed piston means at either end of the roll shaft;

whereby the roll shell can be selectively moved in opposed directions relative to the roll shaft, as desired.

8. A controlled deflection roll as set forth in claim 1, wherein:

the pivotal attachment of the bearing support means to the shaft is at right angles to the axes of the pairs of the opposed shoes, whereby corresponding ones of the pairs of opposed shoes are aligned in the same direction with the deflection shoe means and the corresponding opposing ones of the pairs of shoes are aligned in the opposite direction with the deflection shoe means.

9. A controlled deflection roll for engaging a mating roll along a nip line of contact therebetween, comprising:

a stationary roll shaft having a longitudinal axis;

a bearing ring pivotally attached to the shaft near either end thereof;

a roll shell disposed about the roll shaft and defining, with the shaft, a space therebetween;

a bearing near either end of the roll shell, and mounted on the bearing ring, for rotatably supporting the roll shell on the bearing ring;

deflection, or crown, correction control means within the roll shell and co-extending with the roll shaft in the space therebetween for applying a deflection, or crown, correcting force to the roll shell relative to the roll shaft;

pressure means, including a pair of opposed load shoes, for engaging and supporting the bearing ring and forcefully moving it and the roll shell in either direction about its pivotal attachment outwardly relative to the longitudinal axis of the roll, as desired;

fluid pressure source means operatively connected to the roll to provide a first source of fluid pressure to selected ones of the opposed load shoes and a second source of fluid pressure to the deflection, or crown, control correction means, for actuating the pressure means and deflection, or crown, control correction means, to move the roll shell to an operative position relative to the shaft axis and to maintain the roll deflection, or crown, in a desired contour and load along the contour relative to a nip line of contact with a mating roll in a press couple, as desired.

10. The controlled deflection roll as set forth in claim 9, wherein:

the first source of fluid pressure comprises means for separately supplying fluid pressure to corresponding ones of the load shoes at either end of the roll whereby the shoes supporting the bearing ring in the same direction are controlled independently of the load shoes supporting the bearing ring in the opposite direction.

11. A controlled deflection roll as set forth in claim 9, wherein:

the pressure means comprise separately controlled means at either end of the roll to provide different loading forces in the same direction at either end of the roll, as desired.

12. A controlled deflection roll as set forth in claim 11, wherein:

the pressure means comprise separate sources of controlled fluid pressure.

13. A controlled deflection roll as set forth in claim 9, wherein:

the first and second sources of fluid pressure are connected such as to actuate the pressure means to move and load the roll, and to actuate the deflection, or crown, correction control means to correct the deflection, or crown, in the same direction.

14. A controlled deflection press roll for engaging a mating roll along a nip line of contact therebetween, comprising:

a stationary roll shaft having a longitudinal axis;

a bearing ring pivotally attached to the shaft near either end thereof;

a roll shell disposed about the roll shaft and defining, with the shaft, a space therebetween;

a bearing near either end of the roll shell, and mounted on the bearing ring, for rotatably supporting the roll shell on the bearing ring;

deflection, or crown, correction control means within the roll shell and co-extending with a roll shaft in the space therebetween for applying a deflection, or crown, correcting force to the roll shell relative to the roll shaft;

pressure means, including a pair of opposed load shoes, for engaging and supporting the bearing ring and forcefully moving it and the roll shell in either direction about its pivotal attachment outwardly relative to the longitudinal axis of the roll, as desired;

first pressure source means operatively connected to the roll to provide a first source of fluid pressure to selected ones of the opposed load shoes and a second source of fluid pressure to the deflection, or crown, control correction means for actuating the pressure means and deflection, or crown, control correction means to move the roll shell to an operative position relative to the shaft axis and to maintain the roll deflection, or crown, in a desired contour and load along the contour relative to a nip line of contact with a mating roll in a press roll couple, as desired;

the pressure means further includes opposed piston means slidably received in bore means in the roll shaft at either end of the roll, each piston means pressurably supporting a corresponding load shoe;

the first source of fluid pressure is selectively applied to corresponding ones of the opposed piston means to provide roll shell moving and loading force in the same direction as the deflection control means, or in the opposite direction, as desired.

* * * * *